July 26, 1932. G. H. TABER 1,869,285
VEHICLE BODY SUSPENSION
Filed Feb. 9, 1931
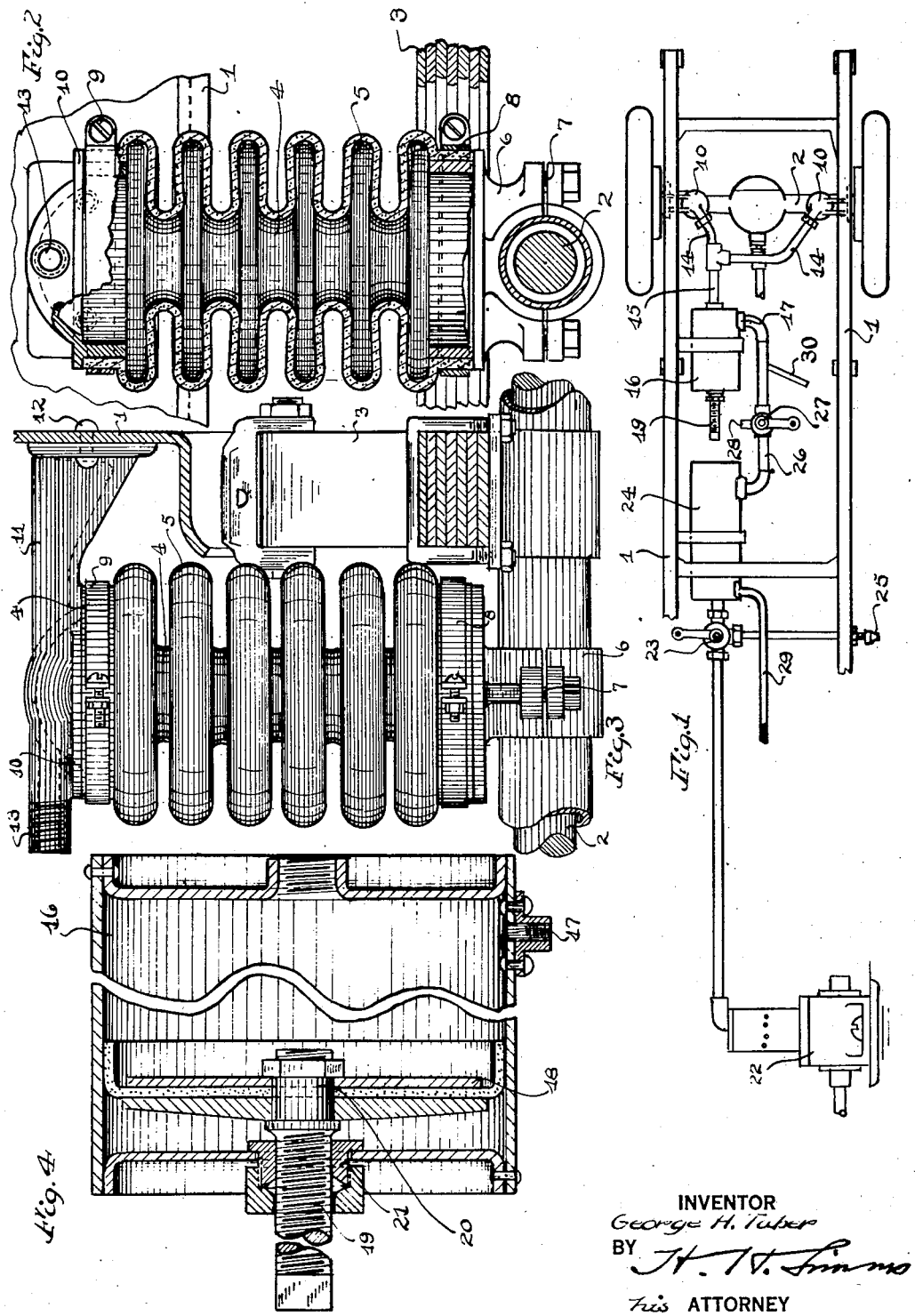
INVENTOR
George H. Taber
BY
His ATTORNEY Patented July 26, 1932

1,869,285

UNITED STATES PATENT OFFICE

GEORGE H. TABER, OF BINGHAMTON, NEW YORK

VEHICLE BODY SUSPENSION

Application filed February 9, 1931. Serial No. 514,406.

The present invention relates to vehicle body suspensions, and an object thereof is to make it possible to adjust the suspension to load conditions so as to obtain the proper suspension for any load condition. Another object of the invention is to provide in connection with a spring supporting means such as now commonly employed and has a constant carrying load, a supporting device which is adjustable to meet any load condition. Still another object of the invention is to provide in connection with the body suspension a resilient chambered device with means for supplying an expansible fluid thereto in amounts to adjust the suspension to a desired height or clearance between the frame and the axle for any load condition. A further object of the invention is to provide a novel resilient chambered device for use in a suspension for the body of a vehicle. A still further object of the invention is to provide in connection with a spring suspension of a vehicle a resilient fluid means which may be adjusted to lift the body above the normal balance line of the spring suspension so that a desirable amount of the body weight may be sustained substantially by the resilient fluid means whereby vibrations are reduced and easier riding action obtained.

To these and other ends, the invention consists of certain parts and combinations of parts all of which will be hereinafter described; the novel features being pointed out in the appended claims.

In the drawing:

Fig. 1 is a fragmentary plan view of a vehicle equipped with the present invention;

Fig. 2 is a detailed sectional view of one of the expansive and resilient chambered devices;

Fig. 3 is a view in elevation of one of said devices; and

Fig. 4 is a fragmentary sectional view of the compression chamber.

The most common form of body suspension for vehicles comprises a spring means in the form of leaf springs. These springs are interposed between the frame and the axle and are as a rule constructed for sustaining the maximum carrying load of the vehicle and must therefore be stiff enough to prevent striking between the frame and the axle or spring parts under the maximum load conditions. This construction, however, produces, particularly with light loads, a very hard riding action. The provision of lighter springs would under heavy loads, cause the frame to strike the axle or spring parts although giving an easier riding action for light loads.

According to this invention, a suspension is provided which may be adjusted readily by the driver of the vehicle to meet any load condition while at the same time obtaining an easy riding action for such load condition.

In carrying out this invention, it is preferred to interpose between the frame 1 and the axle 2 a leaf spring suspension 3 of any known form but preferably constructed so as not to sustain the maximum carrying load but to sustain substantially only the minimum load of the vehicle.

Associated with this spring suspension or supporting means is a readily adjustable resilient suspension or supporting means 4. This readily expansible resilient suspension means, in this instance, embodies one or more adjustable and expansible chambered devices each preferably in the form of a vertical column made of pliable material such as rubber or rubberized fabric capable of holding air without leakage, and being provided with hollow annular enlargements 5 arranged one above the other. In this instance, two of these devices are shown interposed between the rear axle 2 and the frame 1, the rear axle having for each device a head 6 clamped thereto at 7 and having the lower end of a column 4 clamped to such head at 8. The upper end of the column is clamped at 9 to a head 10 which has a bracket arm 11 secured at 12 to the frame 1. Each head 10 has an opening 13 communicating with the head and the interior of the column. In this instance, the two columns communicate with each other through the two pipings 14 and a pipe 15 which communicates with a pressure controlling chamber 16 to which air is supplied through the opening 17 by any suitable means. The pressure controlling chamber has within it a movable piston or diaphragm 18 which through a screw rod 19 having a rigid connection 20 with the piston, and screw threaded engagement with a bushing 21 in the head of the cylinder 16 so that the turning of the rod 19 effects the movement of the piston 18 in the chamber or cylinder and varies the capacity of said chamber or cylinder. The fact that both of the air columns are connected together and to the chamber or cylinder 16 makes the pressure in the two columns equal and at the same time gives to the air in the column a compression or expansion effect dependent on the position of the piston 18 in the cylinder 16. By adjusting this piston the compression in the air columns can be raised or lowered and at the same time the cylinder or chamber provides a storage space for sufficient air to give the desired cushioning effect. It is apparent that if the body of air is too small then a hard riding action will be obtained, whereas, if the body of air is too large, too great a resiliency will be obtained. This chamber permits the making of the expansion device relatively small and compact while at the same time giving a sufficient body of air for obtaining the desired resiliency in said devices. In other words, it forms an auxiliary compression chamber for the expansible devices.

In this instance, the air is supplied by an air pump 22 which can through a multiple way valve 23 be used for supplying air to a reservoir or reserve tank 24 or supplying air through an outlet 25 for inflating tires. The valve 23 may also be turned to connect the reservoir 24 with the outlet 25 so that the tires may be inflated from the reservoir or reserve tank. Leading from the reserve tank is a piping 26 which connects with the opening 17 of the compression chamber 16, and in this piping 26 is a multi-way valve 27 which may be employed for connecting the reservoir 24 with the compression chamber 16, or for connecting the compression chamber 16 with an exhaust outlet 28, or for closing both the piping 26 and the outlet 28. A pipe 29 may lead from the reservoir or reserve tank 24 to a suitable pressure gage, not shown, for the purpose of indicating the pressure in the reserve tank 24. A pipe 30 leads from the piping 26 between the valve 27 and the opening 17 for the purpose of determining the pressure actingly engaged in the suspension.

With this invention, the ordinary spring suspension is preferably combined with a separate resilient supporting means, both being separately interposed between the axle and the frame of the vehicle. The resilient supporting means is adjustable to the load condition and preferably holds the frame above the balance line of the spring suspension. In this embodiment, the separate adjustable resilient means is in the form of an expansible chambered device to which air or other expansible fluids may be readily supplied. A compression chamber may connect with one or more of these devices in order that the device may be made of a minimum size while at the same time the body of air controlled by its expansion and contraction is of a sufficient amount to give the desired riding qualities.

What I claim as my invention and desire to secure by Letters Patent is:

1. In combination with a vehicle frame, and an axle, a suspension for the frame embodying resilient means interposed between the frame and the axle including a yielding air containing chamber, and a compression chamber having communication with said yielding air containing chamber to prevent excessive pressure in the yielding air containing chamber, and means for varying the effective cubical contents of the compression chamber.

2. The combination with a spring supported vehicle frame, of supplementary yielding supporting means for the said vehicle frame comprising an expansible chamber, an air chamber connected with the expansible chamber, a movable element within the expansible chamber for varying the capacity thereof and the contained air pressure for sustaining the load, and means between the said movable element and expansible chamber for adjusting the element and holding it in the required adjusted position.

3. The combination with a spring supported vehicle frame and a supplementary yielding supporting means therefor comprising an expansible chamber, of an air chamber connected to the expansible chamber, means for varying the effective capacity of the air chamber and the pressure of the air therein, a reserve air tank, a valved connection between the reserve tank and the air chamber, an air compressor, and a valved connection between the air compressor and the reserve tank.

4. In combination with a vehicle frame and an axle, a suspension for the frame supporting the frame from the axle, including springs interposed between the frame and the axle, a separate resilient supporting means interposed between the axle and the frame including an expansible chamber for the reception of a fluid, a hollow head clamped to one end of said chamber and communicating with the latter and having an arm secured to the frame and also provided with an inlet opening for the fluid, and means for supplying fluid to the said chamber through said inlet of said head.

5. In combination with a vehicle frame and an axle, a suspension for the frame supporting the frame from the axle, including springs interposed between the frame and the axle, a separate resilient supporting means interposed between the axle and the frame including an expansible chamber for the reception of a fluid, a hollow head clamped to one end of said chamber and communicating with the latter and having an arm secured to the frame and also provided with an inlet opening for the fluid, means for supplying fluid to the said chamber through said inlet of said head, and means for changing the amount of air in said chamber to meet road conditions.

6. In combination with a vehicle frame and an axle, a suspension for the frame supporting the frame from the axle, including springs interposed between the frame and the axle, a separate resilient supporting means interposed between the axle and the frame including an open ended expansible chamber for the reception of a fluid, a hollow head clamped to one end of said chamber and communicating with the latter and having an arm secured to the frame and also provided with an inlet opening for the fluid, means for supplying fluid to the said chamber through said inlet of said head, a head clamped to the opposite end of said chamber and having connection with the axle, means for supplying air to the chamber through the first named head, and means for controlling the supply of air to the chamber.

7. In combination with a vehicle frame and an axle, a suspension for the frame supporting the frame from the axle, including springs interposed between the frame and the axle, a separate resilient supporting means interposed between the axle and the frame including an open ended expansible chamber for the reception of a fluid, a hollow head clamped to one end of said chamber and communicating with the latter and having an arm secured to the frame and also provided with an inlet opening for the fluid, means for supplying fluid to the said chamber through said inlet of said head, a head clamped to the opposite end of said chamber and having connection with the axle, means for supplying air to the chamber through the first named head, means for controlling the supply of air to the chamber, a reserve air tank, and a valved connection between the reserve tank and the air chamber.

GEORGE H. TABER.